(12) United States Patent
Ashby (10) Patent No.: US 8,986,165 B2
(45) Date of Patent: Mar. 24, 2015

(54) USER IDENTIFICATION AND SAFETY KEY FOR EXERCISE DEVICE

(71) Applicant: ICON Health & Fitness, Inc., Logan, UT (US)

(72) Inventor: Darren C. Ashby, Richmond, UT (US)

(73) Assignee: ICON Health & Fitness, Inc., Logan, UT (US)

( * ) Notice: Subject to any disclaimer, the term of this patent is extended or adjusted under 35 U.S.C. 154(b) by 251 days.

(21) Appl. No.: 13/787,713

(22) Filed: Mar. 6, 2013

(65) Prior Publication Data
US 2013/0237374 A1 Sep. 12, 2013

Related U.S. Application Data

(60) Provisional application No. 61/607,851, filed on Mar. 7, 2012.

(51) Int. Cl.
*A63B 24/00* (2006.01)

(52) U.S. Cl.
USPC ......... 482/4; 482/1; 482/51; 482/54; 482/901

(58) Field of Classification Search
USPC .............. 482/1–9, 51, 54, 900–902; 434/247
See application file for complete search history.

(56) References Cited

U.S. PATENT DOCUMENTS

| | | | |
|---|---|---|---|
| 4,771,148 A | 9/1988 | Bersonnet | |
| 4,904,829 A | 2/1990 | Berthaud et al. | |
| 5,034,576 A | 7/1991 | Dalebout et al. | |
| 5,760,353 A * | 6/1998 | Rapp | 200/17 R |
| 6,307,167 B1 * | 10/2001 | Kajio et al. | 200/43.11 |
| 6,660,949 B2 * | 12/2003 | Kamino et al. | 200/43.07 |
| 6,830,541 B2 * | 12/2004 | Wu | 482/54 |
| 6,875,157 B1 * | 4/2005 | Wang et al. | 482/8 |
| 6,974,404 B1 * | 12/2005 | Watterson et al. | 482/54 |
| 8,177,688 B2 * | 5/2012 | Burnfield et al. | 482/7 |

* cited by examiner

*Primary Examiner* — Glenn Richman
(74) *Attorney, Agent, or Firm* — Workman Nydegger (57) ABSTRACT

A key includes a safety mechanism operatively connectable to a safety port on an exercise device. When the safety mechanism is operatively connected to the safety port, the exercise device is placed in an operational configuration and when disconnected, the exercise device is in a non-operational configuration. The key further includes a user identification mechanism that is communicatively connectable to a user identification port on the exercise device and transmits user identification information to the exercise device.

19 Claims, 5 Drawing Sheets

USER IDENTIFICATION AND SAFETY KEY FOR EXERCISE DEVICE

CROSS-REFERENCE TO RELATED APPLICATIONS

This application claims priority to U.S. Provisional Patent Application No. 61/607,851 filed Mar. 7, 2012.

TECHNICAL FIELD

In general, the present invention relates to exercise equipment. More specifically, the present invention relates to a key, connectable to an exercise device, that serves both safety and user identification functions.

BACKGROUND

Stationary exercise devices have become an increasingly popular way to exercise. Over time, stationary exercise devices have evolved to include a wide variety of advanced features, including safety features that help make exercise devices safer to use and to be around. For example, U.S. Pat. No. 5,034,576 titled "Console Switch" discloses a keyway in an exercise device and a removable key. The exercise device is deactivated when the key is removed from the keyway. U.S. Pat. Nos. 4,904,829 and 4,771,148 also disclose safety systems that may be used in exercise devices.

While conventional safety keys provide an important safety feature, they are limited in both function and usefulness. For example, the sole function of most conventional safety keys is to disable an exercise device when the key is not properly connected to the exercise device.

SUMMARY

In one embodiment, a key connectable with an exercise device includes a safety mechanism that is operatively connectable to a safety port on an exercise device and a user identification mechanism that is communicatively connectable to a user identification port on the exercise device. The safety mechanism places the exercise device in an operational configuration when the safety mechanism is operatively connected to the safety port and places the exercise device in a non-operational configuration when the safety mechanism is not operatively connected to the safety port. The user identification mechanism transmits user identification information to the exercise device when the user identification mechanism is communicatively connected to the user identification port.

In one aspect that may be combined with any of the aspects herein, the user identification information comprises key identifying information.

In another aspect that may be combined with any of the aspects herein, the user identification mechanism may selectively receive data and the key includes a memory that stores the received data.

In another aspect that may be combined with any of the aspects herein, the memory stores data relating to a use of an exercise device.

In another aspect that may be combined with any of the aspects herein, the memory stores data that is input to the key memory through user input controls on an exercise device.

In another aspect that may be combined with any of the aspects herein, the data that is input through user input controls and stored within the memory includes at least one of a user's gender, age, and weight.

In another aspect that may be combined with any of the aspects herein, the user identification information comprises at least a portion of the data that is stored within the key memory.

In another aspect that may be combined with any of the aspects herein, the user identification mechanism transmits user identification information through a wireless connection.

In another aspect that may be combined with any of the aspects herein, the user identification mechanism comprises a radio frequency identification chip.

In another aspect that may be combined with any of the aspects herein, the user identification mechanism is communicatively connectable to a user identification port on an external computer.

In another aspect that may be combined with any of the aspects herein, the user identification mechanism comprises a universal serial bus drive.

In another aspect that may be combined with any of the aspects herein, the safety mechanism is operatively connectable to an exercise device safety port via a reed switch.

In another aspect that may be combined with any of the aspects herein, a magnet is used to maintain an operative connection between the key and an exercise device.

In another aspect that may be combined with any of the aspects herein, the key includes a lanyard.

In another aspect that may be combined with any of the aspects herein, the lanyard includes a user attachment mechanism.

In another aspect that may be combined with any of the aspects herein, an exercise system includes an exercise device having a key receiver.

In another aspect that may be combined with any of the aspects herein, a first key is selectively connectable to the key receiver.

In another aspect that may be combined with any of the aspects herein, a second key is selectively connectable to the key receiver when the first key is not connected to the key receiver.

In another aspect that may be combined with any of the aspects herein, the exercise device is in an operational configuration when either the first or second key is connected to the key receiver.

In another aspect that may be combined with any of the aspects herein, the exercise device is in a non-operational configuration when neither the first nor second key is connected to the key receiver.

In another aspect that may be combined with any of the aspects herein, the exercise device receives user identification information from the first key when the first key is connected to the key receiver.

In another aspect that may be combined with any of the aspects herein, the exercise device receives user identification information from the second key when the second key is connected to the key receiver.

In another aspect that may be combined with any of the aspects herein, the user identification information comprises key identifying information.

In another aspect that may be combined with any of the aspects herein, the user identification information includes at least one of a user's gender, age, weight, height, body fat percentage, resting heart rate, and blood pressure.

In another aspect that may be combined with any of the aspects herein, an exercise system includes an external key having a safety mechanism and a user identification mechanism.

In another aspect that may be combined with any of the aspects herein, an exercise system includes a first exercise device having a first key receiver comprising a first safety port and a first user identification port.

In another aspect that may be combined with any of the aspects herein, an exercise system includes a second exercise device having a second key receiver comprising a second safety port and a second user identification port.

In another aspect that may be combined with any of the aspects herein, a safety mechanism is operatively and individually connectable to first and second safety ports.

In another aspect that may be combined with any of the aspects herein, a user identification mechanism is communicatively and individually connectable to first and second user identification ports.

In another aspect that may be combined with any of the aspects herein, a first exercise device is maintained in an operational configuration when a safety mechanism is operatively connected to a first safety port and is placed in a non-operational configuration in the absence of an operable connection between the safety mechanism and the first safety port.

In another aspect that may be combined with any of the aspects herein, a second exercise device is maintained in an operational configuration when a safety mechanism is operatively connected to a second safety port and is placed in a non-operational configuration in the absence of an operable connection between the safety mechanism and the second safety port.

In another aspect that may be combined with any of the aspects herein, user identification information is transmitted to a first exercise device when a user identification mechanism is communicatively connected to a first user identification port.

In another aspect that may be combined with any of the aspects herein, user identification information is transmitted to a second exercise device when a user identification mechanism is communicatively connected to a second user identification port.

In another aspect that may be combined with any of the aspects herein, the first exercise device is a treadmill and the second exercise device is either an elliptical machine or an exercise bike.

DETAILED DESCRIPTION

Figure 1:
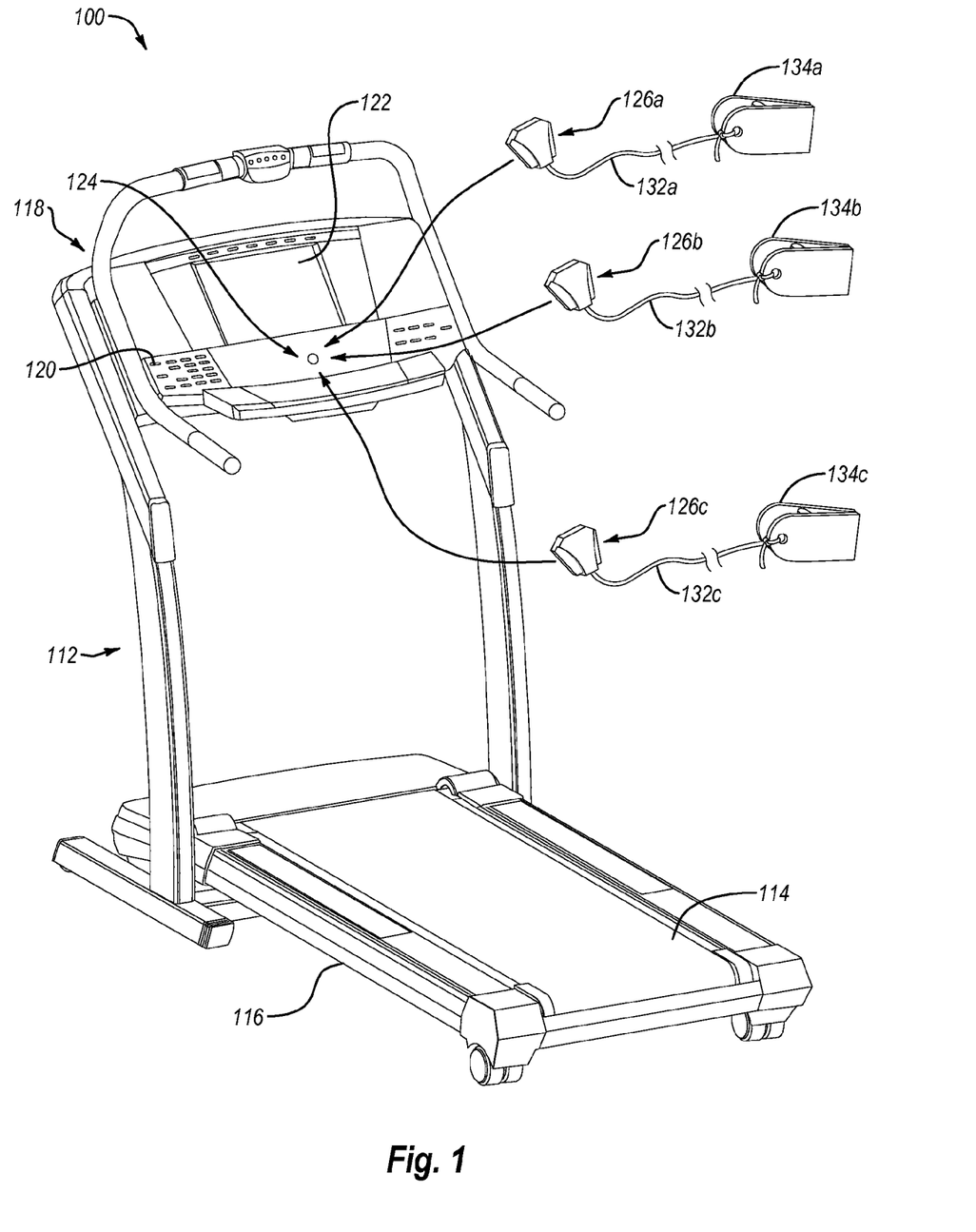
FIG. 1 illustrates an exercise system according to one embodiment of the present invention, which includes an exercise device and multiple external keys.

FIG. 1 illustrates an exercise system 100. Exercise system 100 includes an exercise device 112, which is illustrated as a treadmill. Exercise system 100 also includes external keys 126a-c. External keys 126a-c are individually connectable, both operatively and communicatively, to exercise device 112 through a key receiver 124. As described in more detail below, exercise device 112 is in an operable configuration when one of external keys 126a-c is operatively connected to key receiver 124. In the absence of an operable connection between one of external keys 126a-c and key receiver 124, exercise device 112 is in a non-operable or safe configuration. In addition, when one of external keys 126a-c is communicatively connected to key receiver 124, user identification information is transmitted from the connected external key to exercise device 112. This user identification information may comprise an alphanumeric or other type of signal that identifies the external key or it may comprise information that more specifically relates to the owner of the external key.

Exercise device 112 may include multiple different moveable members, such as a belt 114 and a tread base 116. Moveable members may have one or more operating parameters that are selectively adjustable. One example of an operating parameter on exercise device 112 is the speed of belt 114. An actuator, for example a belt motor, may be mechanically associated with and selectively adjust the speed at which belt 114 rotates. Another example of an operating parameter is the inclination of tread base 116. An actuator, for example an incline motor, may selectively adjust the incline of tread base 116.

The actuators that selectively adjust the moveable members on exercise device 112 may be in electrical communication with a console 118. Console 118 may include user input controls 120, a display screen 122, and electronics. Input provided through user input controls 120 may direct the actuators to selectively adjust the speed of belt 114 and/or the inclination of tread base 116. User input controls 120 may include buttons, dials, knobs, switches, and/or other input mechanisms.

Display screen 122 may include video displays, liquid crystal displays (LCD), light emitting diodes (LEDs), cathode ray tube (CRT) displays, electroluminescent displays (ELD), gas-plasma displays, thin film transistor (TFT) displays, virtual reality (VR) displays, and the like. Display screen 122 may provide information representative of the operating parameters of exercise device 112. For example, display screen 122 may provide information such as the speed and/or incline levels of the moveable members. Additional information relating to the exercise device or exercise being performed, including the duration of the workout, the elevation climbed, biometric information of the user, etc. can also be displayed on display screen 122. This information may be provided numerically, graphically, or through combinations thereof. To provide a more realistic experience, output devices may provide a representation of a trail, road, or path to be traversed by a person performing an exercise.

Figure 2:
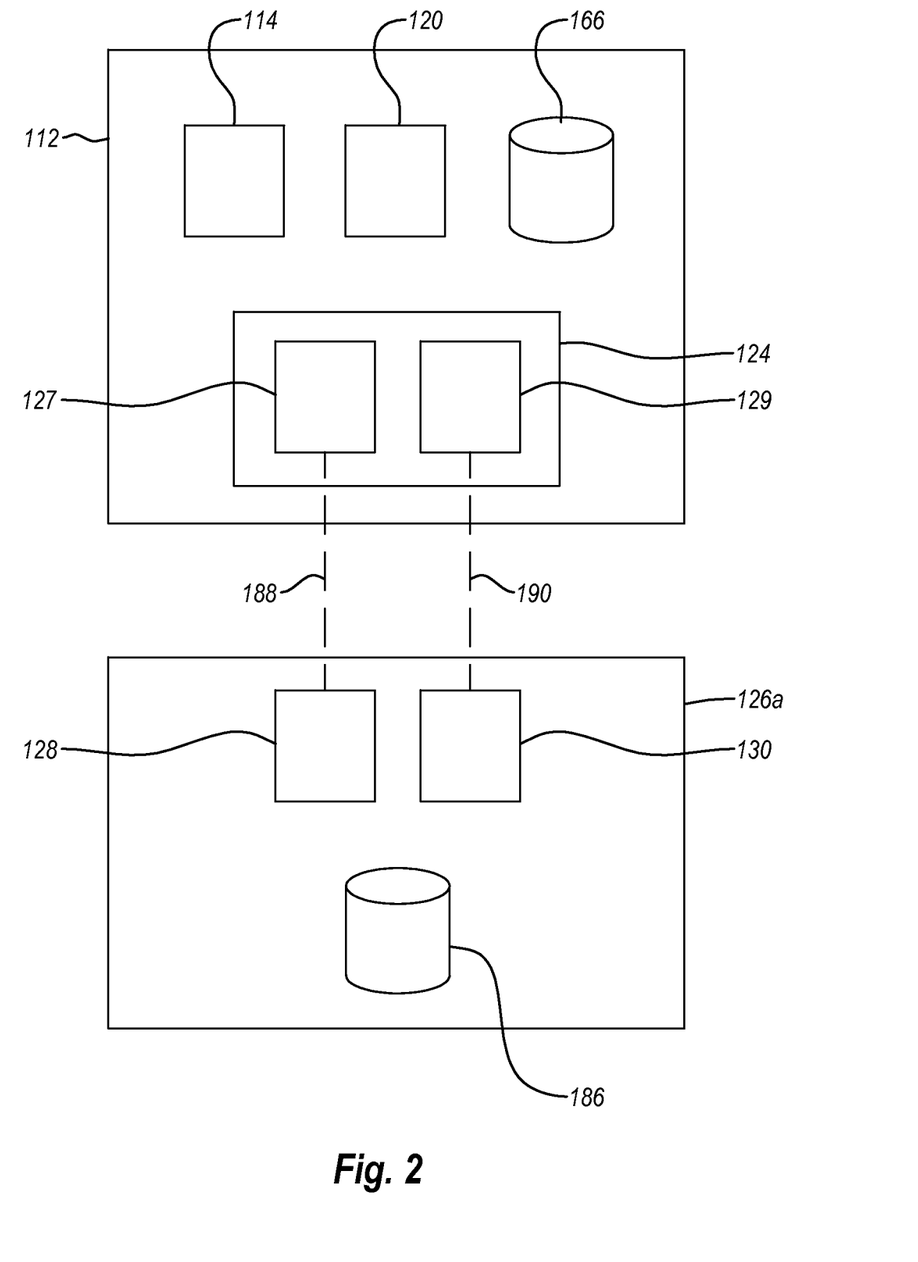
FIG. 2 illustrates a block diagram of the exercise device and one of the external keys from the exercise system of FIG. 1.

FIG. 2 illustrates a block diagram of exercise device 112 and external key 126a. As can be seen in FIG. 2, exercise device 112 includes belt 114, user input controls 120, and a memory 166. Exercise device 112 further includes key receiver 124. Key receiver 124 may include a safety port 127 and a user identification port 129. External key 126a may include a safety mechanism 128, a user identification mechanism 130, and a memory 186.

Safety port 127 and safety mechanism 128 may be connected via an operative connection 188. One of skill in the art will appreciate that there are many different ways to operatively connect safety mechanism 128 to safety port 127. For example, operative connection 188 may comprise a physical/wired connection or a non-physical/wireless connection. Specifically, operative connection 188 may comprise a dead man switch such as a reed switch. Safety mechanism 128 may be operatively disconnected from safety port 127 by simply pulling external key 126a away from safety port 127.

A safety mechanism, according to the present invention, provides a safety feature for individuals who use and are around exercise devices. When safety mechanism 128 is operatively connected to safety port 127, exercise device 112 may be placed in an "operational" or "use" configuration. In the operational or use configuration, exercise device 112 may be functional and permit a user to perform an exercise on exercise device 112 in the usual and intended way. With regard to exercise device 112, the operational or use configuration would allow a user to walk or run on belt 114 at a desired speed and at a desired inclination.

However, when safety mechanism 128 is not operatively connected to safety port 127, exercise device 112 may be placed in a "non-operational" or "safe" configuration. In a non-operational or safe configuration, a user's performance of an exercise on exercise device 112 may be impeded in some way. For example, with regard to exercise device 112, power may not be supplied to the actuator that rotates belt 114 and/or the actuator that changes the inclination of tread base 116. Alternatively, belt 114 and/or tread base 116 may be placed in a "locked" position, such that belt 114 is precluded from rotating and/or tread base 116 is precluded from changing inclination.

Figure 3:
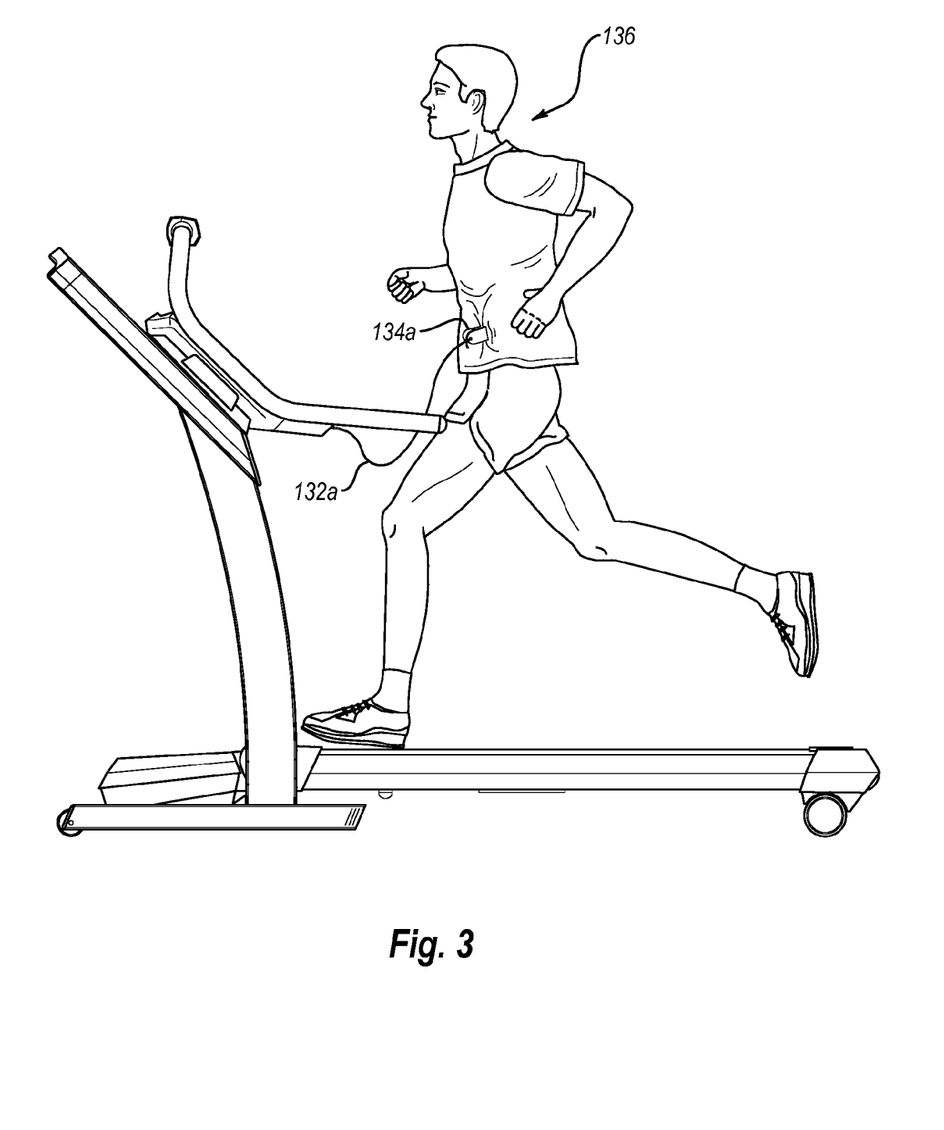
FIG. 3 illustrates a side view of the exercise system of FIG. 1 in operation.

As shown in FIG. 1, external keys 126a-c may also include lanyards 132a-c, respectively, that are secured at one end to external keys 126a-c and to user attachment mechanisms 134a-c at the other end. A user attachment mechanism may be secured to a user's clothing or to a user's body while he or she performs an exercise on exercise device 112. For example, FIG. 3 illustrates exercise system 100 in use, with a user 136 running on exercise device 112. External key 126a is operatively connected to exercise device 112. Lanyard 132a is secured to external key 126a at one end and to user attachment mechanism 134a, which is illustrated as a clip, at the other end. User attachment mechanism 134a is secured to the clothing of user 136. In alternative embodiments, a user attachment mechanism may comprise a band that can be secured to the body of a user.

As can be seen in FIG. 3, lanyard 132a is sufficiently long to allow user 136 to run or walk on exercise device 112. However, if user 136 steps away from exercise device 112 or falls down while performing an exercise on exercise device 112, external key 126a may be operatively disconnected from exercise device 112. As stated previously, once safety mechanism 128 is operatively disconnected from safety port 127, exercise device 112 is placed in the non-operational or safe configuration and belt 114 may stop moving.

Referring back to FIG. 2, user identification port 129 and user identification mechanism 130 may be connected via a communication connection 190. One of skill in the art will appreciate that there are many different ways to communicatively connect user identification mechanism 130 to user identification port 129. For example, communication connection 190 may comprise a wireless/non-physical or a wired/physical connection. Once a communicative connection is established between user identification port 129 and user identification mechanism 130, user identification information may be transmitted from user identification mechanism 130 to user identification port 129.

There are many devices that may transmit and receive user identification information through a wireless or non-physical connection. For example, user identification mechanism 130 and user identification port 129 may comprise a radio frequency identification ("RFID") chip and receiver, respectively. User identification mechanism 130 may also wirelessly communicate with key receiver 126 via other broadcast technology including Bluetooth technology or any other suitable wireless transmission technology or medium. Alternatively, user identification mechanism 130 may be communicatively connected to user identification port through a wired or physical connection. For example, user identification mechanism 130 and user identification port 129 may comprise a universal serial bus ("USB") drive and port, respectively, a secure digital ("SD") card and port, respectively or a magstrip card and card reader, respectively.

When user identification mechanism 130 is communicatively connected to user identification port 129, user identification information may be transmitted from user identification mechanism 130 to exercise device 112. In one embodiment, the user identification information may comprise key identifying information. The key identifying information may include one or more alphanumeric or other signals that uniquely correspond with an external key. Thus, for example, when external key 126a is connected with exercise device 112, key identifying information may be transmitted from external key 126a and received by exercise device 112 to allow exercise device 112 to distinguish external key 126a from external keys 126b-c. External keys 126b-c may transmit their own unique key identifying information to exercise device 112 so that each of external keys 126a-c can be distinguished from each other and from other external keys.

In addition to identifying the specific external key, the key identifying information received from an external key may be used by exercise device 112 to identify data about the owner of the external key. For example, data about the owner of an external key may be stored within memory 166 of exercise device 112. The stored data may be associated with the key identifying information of a specific external key. When the specific external key is connected to exercise device 112 and the key identifying information is transmitted from the external key to exercise device 112, exercise device 112 may retrieve the data stored in memory 166 that is associated with the received key identifying information. In this way, exercise device 112 may be able to identify information regarding a specific person by recognizing the key identifying information transmitted by that person's external key.

Exercise device 112 may have data stored in memory 166 regarding multiple key owners. The stored data regarding each key owner may be associated with key identifying information from each key owner's key. Accordingly, exercise device 112 may retrieve data regarding a specific individual when that individual connects his/her external key to exercise device 112.

The associated data (e.g., data about key owners) may include the individual's gender, age, height, weight, body fat percentage, resting heart rate, blood pressure, etc. This associated data may also include information regarding preferences of the individual, including but not limited to fan speed, console height, or other adjustable features on an exercise device. This associated data may further include information regarding prior exercise sessions that the individual has completed, including but not limited to the time of the workout, the duration of the workout, the type of workout, the average speed of the workout, number of calories burned, and any other parameters associated with the workout.

The associated data may be stored within memory 166 that is included within exercise device 112. For example, exercise device 112 may include flash memory, RAM, ROM, EEPROM, CD-ROM or other optical disk storage, magnetic disk storage or other magnetic storage devices, or any other medium which can be used to store data. This associated data may be input into the memory of exercise device 112 in a number of different ways. For example, associated data may be input and stored within memory 166 of exercise device 112 using user input controls 120.

Exercise device 112 may also include software or other executable code that enables exercise device 112 to associate the unique signal received from user identification mechanism 130 with data that corresponds to a specific individual. Thus, three different individual users, each having one of external keys 126a-c, may be able to operatively and communicatively connect their respective key with exercise device 112 and have exercise device 112 associate the unique signal of each key with data that corresponds to each individual user.

In another embodiment of the present invention, the user identification information may include the associated data (e.g., data about key owners). In this embodiment, the associated data may be stored within memory 186, which is within external key 126a. Memory 186 that is within external key 126a may comprise flash memory, RAM, ROM, EEPROM or any other medium which can be used to store data. Associated data that is part of the user identification information may be transmitted from user identification mechanism 130 to user identification port 129 when user identification mechanism 130 is communicatively connected to user identification port 129. In addition to storing user identification information, external key 126a may also store additional data including specific workout programs.

Figure 4:
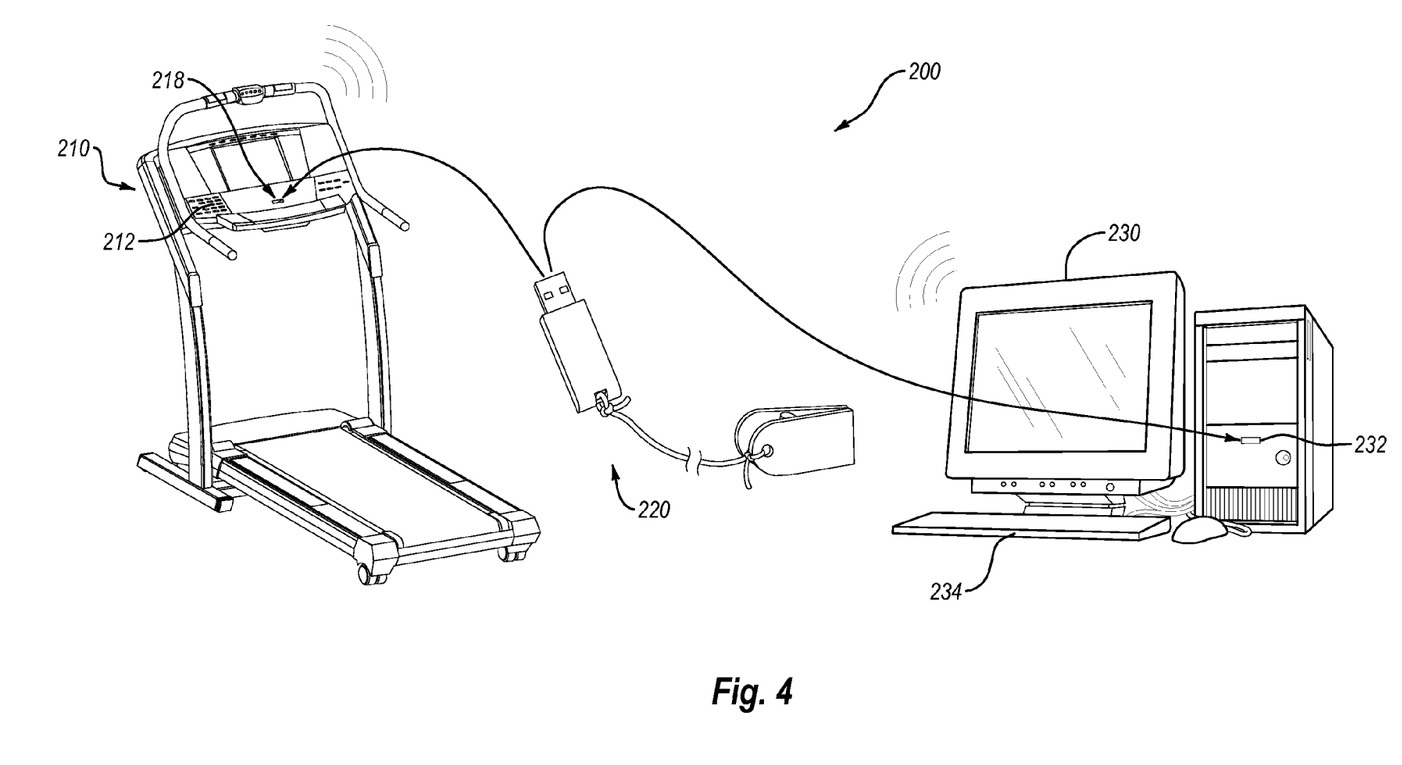
FIG. 4 illustrates an exercise system according to another embodiment of the present invention.

FIG. 4 illustrates an exercise system 200. Exercise system 200 includes an exercise device 210, which is illustrated as a treadmill that is similar to exercise device 112. Exercise device 210 includes a memory, user input controls 212, and a key receiver 218. Exercise system 200 also includes an external key 220 and a computer 230. In exercise system 200, external key 220 includes a USB drive that may be individually connected to exercise device 210 and computer 230. External key 220 may be operatively and communicatively connected to key receiver 218 in order to place exercise device 210 in an operable or use configuration and to transmit user identification information to exercise device 210. In the absence of an operative connection between external key 220 and key receiver 218, exercise device 210 may be in a non-operational or safe configuration.

User identification information may comprise data that is associated with a specific individual. For example, personal data regarding a user, his or her preferences, and/or prior workout history may be stored in memory that is included within external key 220 and transmitted to exercise device 210 as part of the user identification information. Additionally or alternatively, user identification information may comprise key identifying information. This key identifying information may allow exercise device 112 to recognize external key 220. Exercise device 210 may associate a user's personal data with the key identifying information. This personal data may be stored in memory that is included within exercise device 210.

A user may input personal data into memory within exercise device 210 using user input controls 212. A user may also input and store personal data into memory of computer 230 using keyboard 234. Whether the personal data is input into exercise device 210 or computer 230, the personal data may be transferred between exercise device 210, external key 220, and computer 230. For instance, external key 220 may be connected to key receiver 218 on exercise device 210 and the personal data entered into exercise device 210 may be transferred from exercise device 210 to external key 220. External key 220 may then be removed from exercise device 210 and connected to computer 230 through a USB port 232. When external key 220 is so connected to computer 230, the personal data stored on external key 220 may be transferred to computer 230. Similarly, external key 220 may be connected to computer 230 through USB port 232 and the personal data entered into computer 230 may be transferred from computer 230 to external key 220 and then from external key 220 to exercise device 210. Additionally, personal data may be communicated between exercise device 210 and computer 230 via a wired or wireless connection therebetween (e.g., with or without the use of external key 220).

Figure 5:
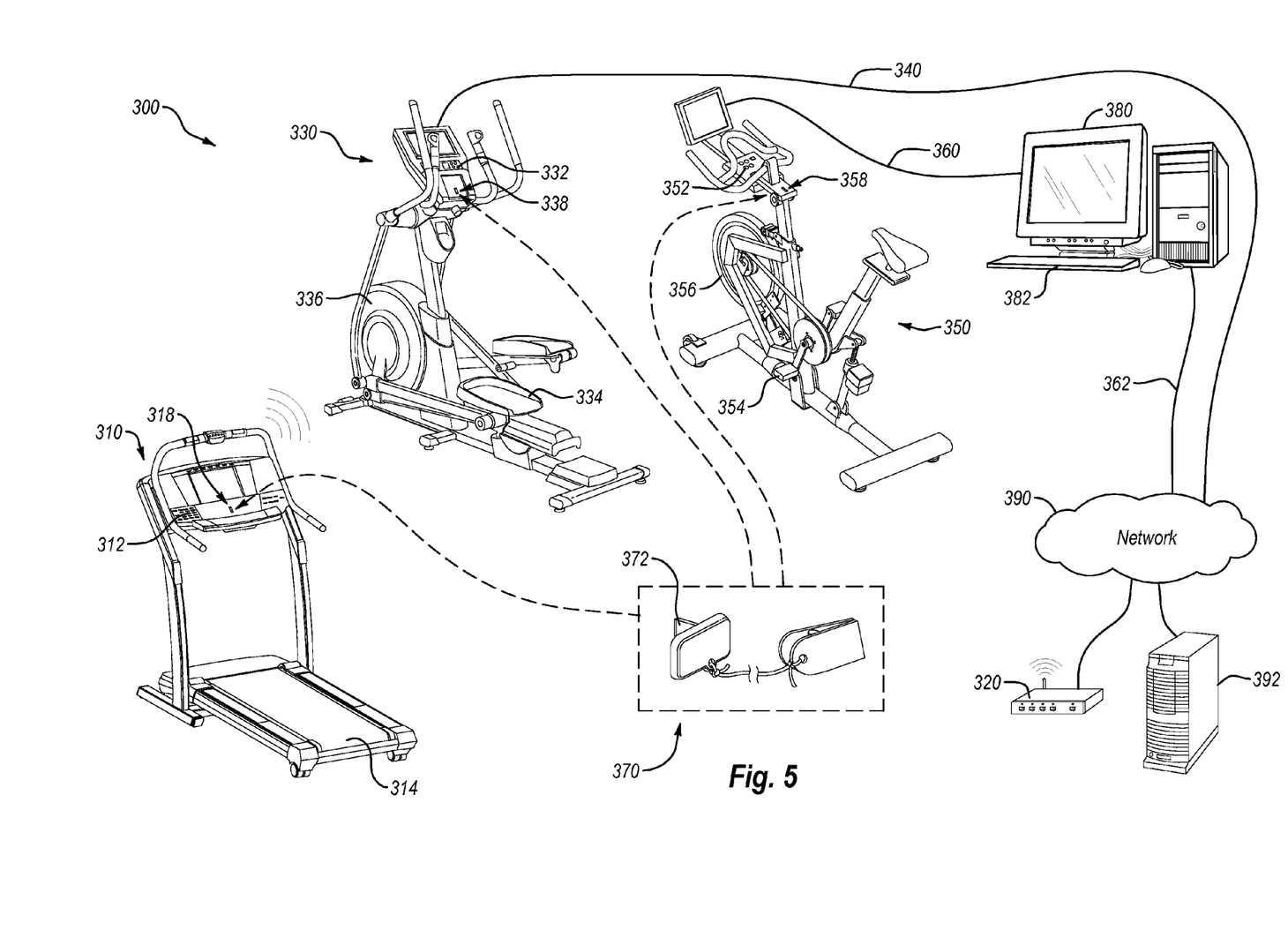
FIG. 5 illustrates an exercise system according to yet another embodiment of the present invention.

FIG. 5 illustrates an exercise system 300 according to yet another example embodiment of the present invention. Exercise system 300 includes three different types of exercise devices: treadmill 310, elliptical machine 330, and exercise bike 350. Treadmill 310 is similar to exercise devices 112 and 210. Exercise device 310 includes a memory, user input controls 312, a belt 314, and a key receiver 318.

Elliptical machine 330 may include a memory, user input controls 332, and multiple different moveable members including pedals 334 and a flywheel 336 that is mechanically associated with pedals 334. During performance of an exercise on elliptical machine 330, movement of pedals 334 causes flywheel 336 to rotate. The moveable members of elliptical machine 330 include operating parameters that are selectively adjustable. One example of an operating parameter on elliptical machine 330 is the amount of resistance applied to flywheel 336. A differing amount of resistance can be applied to flywheel 336 to make the movement of pedals 334 more or less difficult. An actuator, such as a brake, may be used to selectively adjust the amount of resistance that is applied to flywheel 336. Elliptical machine 330 may include moveable members and actuators in addition to those identified herein.

Exercise bike 350 may include a memory, user input controls 352, and multiple different moveable members including pedals 354 and a flywheel 356 that is mechanically associated with pedals 354. During performance of an exercise on exercise bike 350, movement of pedals 354 causes flywheel 356 to rotate. The moveable members of exercise bike 350 include operating parameters that are selectively adjustable. One example of an operating parameter on exercise bike 350 is the amount of resistance applied to flywheel 356. A differing amount of resistance can be applied to flywheel 356 to make the movement of pedals 354 more or less difficult. An actuator, such as a brake, may be used to selectively adjust the amount of resistance that is applied to flywheel 356. Exercise bike 350 may include moveable members and actuators in addition to those identified herein.

Exercise devices 310, 330, and 350 also include key receivers 318, 338, and 358, respectively. Despite the differences in exercise devices 310, 330, and 350, an external key 370 is individually connectable, both operatively and communicatively, to key receivers 318, 338, and 358. For example, external key 370 is individually operatively connectable to each of key receivers 318, 338, and 358 by inserting a flange 372 into an appropriately shaped slot in each of key receivers 318, 338, and 358. Additionally, or alternatively, the operative connection between external key 370 and key receivers 318, 338, and 358 may be established or maintained by a magnetic attraction. A communication connection may be individually established between external key 370 and each of key receivers 318, 338, and 358 through an RFID or other wireless or wired system.

An operative connection between external key 370 and key receivers 318, 338, and 358 may place exercise devices 310, 330 and 350 in an operable or use configuration. In the operable or use configuration, the moveable members of exercise devices 310, 330, and 350 may be functional. The absence of an operative connection between the safety mechanism of external key 370 and key receivers 318, 338, and 358 may place exercise devices 310, 330, and 350 in a non-operable or safe configuration. In a non-operational or safe configuration, a user's performance of an exercise on exercise devices 310, 330, and 350 may be impeded in some way.

For example, with regard to treadmill 310, the operational or use configuration would allow a user to walk or run on belt 314 at a desired speed and at a desired inclination. In the non-operational or safe configuration, the belt 314 may not rotate. With regard to exercise devices 330 and 350, a user may be allowed to perform an exercise in the intended way when these devices are in the operational or use configurations. For example, the operational or use configuration may allow a user to rotate pedals 334 and 354 with resistance applied to the flywheel at a desired level. In the non-operational or safe configuration, a user's performance of an exercise on exercise devices 330 and 350 may be impeded in some way. For example, in the non-operational or safe configuration, pedals 334 and 354 may be locked so as to preclude them from rotating. Alternatively, the flywheel brake may be automatically adjusted to its highest resistance level.

A communicative connection between external key 370 and key receivers 318, 338, and 358 may enable exercise devices 310, 330, and 350 to recognize external key 370 and distinguish it from other external keys that may be communicatively connected to key receivers 318, 338, and 358. For example, external key 370 may transmit key identification information that is unique to external key 370. By recognizing external key 370, exercise devices 310, 330, and 350 may be able to identify personal data relating to the individual that owns external key 370 in a manner similar or identical to that described above.

The personal data about the owner of external key 370 may be input and associated with external key 370 in a number of different ways. For example, the personal data may be input into treadmill 310, elliptical machine 330, or exercise bike 350 using user input controls 312, 332, or 352. Additionally, or alternatively, the personal data may be entered into computer 380 using keyboard 382. Similarly, the personal data may be submitted to a website 392. In any case, once the personal data is received by treadmill 310, elliptical machine 330, exercise bike 350, computer 380, or a website 392, the personal data may be communicated to external key 370 as described herein.

The personal data may be stored in memory that is a part of external key 370, treadmill 310, elliptical machine 330, exercise bike 350, external computer 380, website 392, or another computer that is connectable to network 390. Exercise devices 310, 330, and 350 may obtain and associate personal data that is not stored in memory within exercise devices 310, 330, and 350 through a wired or wireless connection. For example, exercise devices 310, 330, and 350 may associate personal data that is stored at website 392 with external key 370 through network 390.

More specifically, treadmill 310, elliptical machine 330, exercise bike 350, computer 380, and/or website 392 may be communicatively connected to one another (e.g., via wired connections 340, 360, 362, wireless connections, such as through wireless router 320, network 390, or combinations thereof). As a result, personal data may be shared among treadmill 310, elliptical machine 330, exercise bike 350, computer 380, and/or website 392. Thus, for example, when external key 370 is connected to treadmill 310, personal data about the owner of external key 370 may be retrieved or accessed from any of treadmill 310, elliptical machine 330, exercise bike 350, computer 380, and/or website 392.

Thus, in exercise system 300, the owner of external key 370 may connect the key to any one of exercise devices 310, 330, 350. External key 370 not only places the exercise device in an operational mode or configuration, external key 370 may also identify information regarding the owner of external key 370. This eliminates the need for a user to enter identification information each time he or she uses an exercise device.

INDUSTRIAL APPLICABILITY

In general, the present invention relates to an exercise system that includes an exercise device and an external key. The external key is operatively and communicatively connectable to the exercise device and provides safety and user identification functions. Specifically, the external key, when operatively connected to the exercise device may place the exercise device in an operable or use configuration. In the absence of an operative connection between the external key and the exercise device, the exercise device may be in a non-operative or safe configuration. The external key also communicates user identification information to the exercise device when the external key is communicatively connected to the exercise device. The user identification information may include a unique signal that is associated with a specific external key. Recognizing this unique signal may allow an exercise device to identify specific information stored on the exercise device that relates to the individual that owns the external key. Alternatively, or additionally, specific information regarding the individual that owns the external key may be stored on the external key and communicated to the exercise device as part of the user identification information.

An external key, according to the present invention, may be connectable to a key receiver on an exercise device. A key receiver may be located anywhere on an exercise device. A key receiver may include a safety port and a user identification port. The safety port and user identification port may be separate components of a key receiver or they may be part of a single port that serves both a safety function and a user identification function. To the extent that the safety port and user identification port are separate components, they each may be located anywhere on the exercise device. These ports need not be located in the same general area on an exercise device. For example, a safety port may be located on a front portion of an exercise device console while the user identification port may be located within the console of the exercise device.

An external key may include a safety mechanism and a user identification mechanism. The safety mechanism and user identification mechanism may be separate components of an external key or they may be part of a single mechanism that serves both a safety function and a user identification function.

An operative connection may be established between a safety port and a safety mechanism. A communication connection may be established between a user identification port and a user identification mechanism. A visual or audible signal on or from an exercise device may confirm to a user whether an operative connection and/or a communicative connection with an external key is established. For example, a visual signal on a display of an exercise device may provide confirmation of an operative connection between a safety port and a safety mechanism, a communication connection between a user identification port and a user identification mechanism, or both.

Once an external key is operatively connected to a key receiver, the exercise device may be used by a user to perform an exercise. Once an external key is communicatively connected to a key receiver, the exercise device may receive user related data from the external key. This user related data may include key identifying information. Key identifying information may allow an exercise device to distinguish one external key from other external keys. In addition, key identifying information may be associated by the exercise device with other data. This associated data may include data that pertains to the owner of the external key. This associated data may be stored within memory of the exercise device or on another device with which the exercise device is in electrical communication. For example, the associated data may be stored at a website and the exercise device may access the data through a network, such as the Internet. In an alternative embodiment, the user related data that is transmitted from an external key to an exercise device may include the associated data.

Many different external keys may be connected with a wide variety of different exercise devices. For example, in one exemplary implementation of the exercise system, many different individuals may each be given an external key. These individuals may be given access to a fitness facility having a number of different exercise devices to which the external keys may be operatively and communicatively connected. When an individual connects his or her external key to a given exercise device, the exercise device may be placed in an operational mode and the exercise device may obtain data regarding the individual that has been previously entered by the individual or otherwise recorded. As the individual performs an exercise on the exercise device, data regarding the individual's workout may be stored. This data may include the number of calories burned, the type of workout performed, the duration of the workout, etc. This information may be stored and made available to an exercise machine during subsequent workout sessions by the individual.

The invention claimed is:

1. A key connectable with an exercise device, the key comprising:
   a safety mechanism that is operatively connectable to a safety port on an exercise device, wherein the safety mechanism places the exercise device in an operational configuration when the safety mechanism is operatively connected to the safety port, and wherein the exercise device is in a non-operational configuration when the safety mechanism is not operatively connected to the safety port; and
   a user identification mechanism that is communicatively connectable to a user identification port on the exercise device, wherein the user identification mechanism transmits user identification information to the exercise device when the user identification mechanism is communicatively connected to the user identification port, the user identification information comprises key identifying information.

2. The key of claim 1, wherein the user identification mechanism may selectively receive and store data within a key memory.

3. The key of claim 2, wherein the key memory stores data relating to a use of the exercise device.

4. The key of claim 2, wherein the key memory stores data that is input to the key memory through user input controls on an exercise device.

5. The key of claim 2, wherein the data includes at least one of a user's gender, age, weight.

6. The key of claim 5, wherein the user identification information comprises at least a portion of the data that is stored within the key memory.

7. The key of claim 1, wherein the user identification mechanism transmits user identification information through a wireless connection.

8. The key of claim 1, wherein the user identification mechanism comprises a radio frequency identification chip.

9. The key of claim 1, wherein the user identification mechanism is communicatively connectable to a user identification port on an external computer.

10. The key of claim 9, wherein the user identification mechanism comprises a universal serial bus drive.

11. The key of claim 1, wherein the safety mechanism is operatively connectable to an exercise device safety port via a reed switch.

12. The key of claim 1, wherein a magnet is used to maintain an operative connection between the key and an exercise device.

13. The key of claim 1, further comprising a lanyard.

14. The key of claim 13, wherein the lanyard includes a user attachment mechanism.

15. An exercise system comprising:
   an exercise device having a key receiver;
   a first key that is selectively connectable to the key receiver; and
   a second key that is selectively connectable to the key receiver when the first key is not connected to the key receiver,
   wherein the exercise device is in an operational configuration when either the first or second key is connected to the key receiver,
   wherein the exercise device is in a non-operational configuration when neither the first nor second key is connected to the key receiver,
   wherein the exercise device receives user identification information from the first key when the first key is connected to the key receiver, and
   wherein the exercise device receives user identification information from the second key when the second key is connected to the key receiver.

16. The exercise system of claim 15, wherein the user identification information comprises key identifying information.

17. The exercise system of claim 15, wherein the user identification information includes at least one of a user's gender, age, weight, height, body fat percentage, resting heart rate, and blood pressure.

18. An exercise system comprising:
   an external key having a safety mechanism and a user identification mechanism;
   a first exercise device having a first key receiver comprising a first safety port and a first user identification port; and
   a second exercise device having a second key receiver comprising a second safety port and a second user identification port,
   wherein the safety mechanism is operatively and individually connectable to the first and second safety ports, and the user identification mechanism is communicatively and individually connectable to the first and second user identification ports,
   wherein the first exercise device is maintained in an operational configuration when the safety mechanism is operatively connected to the first safety port and is placed in a non-operational configuration in the absence of an operable connection between the safety mechanism and the first safety port, wherein the second exercise device is maintained in an operational configuration when the safety mechanism is operatively connected to the second safety port and is placed in a non-operational configuration in the absence of an operable connection between the safety mechanism and the second safety port, wherein user identification information is transmitted to the first exercise device when the user identification mechanism is communicatively connected to the first user identification port, and wherein user identification information is transmitted to the second exercise device when the user identification mechanism is communicatively connected to the second user identification port.

19. The exercise system of claim 18, wherein the first exercise device is a treadmill and the second exercise device is either an elliptical machine or an exercise bike.

\* \* \* \* \*